United States Patent [19]

Deleens et al.

[11] 4,238,582

[45] Dec. 9, 1980

[54] HYDROLYSIS-RESISTANT COPOLYETHER-ESTERAMIDES

[75] Inventors: Gerard Deleens, Orsay; Bernard Guerin, Bures-sur-Yvette; Claude Poulain, Orsay, all of France

[73] Assignee: Ato Chimie, Courebevoie, France

[21] Appl. No.: 54,976

[22] Filed: Jul. 5, 1979

Related U.S. Application Data

[63] Continuation of Ser. No. 870,578, Jan. 18, 1978, abandoned.

[30] Foreign Application Priority Data

Jan. 24, 1977 [FR] France ............................ 77 01886

[51] Int. Cl.$^3$ ........................ C08L 71/02; C08L 77/00
[52] U.S. Cl. .................................... 525/430; 260/18 N; 525/408; 525/411; 525/926; 525/927
[58] Field of Search .................. 260/857 PE; 525/408, 525/411, 430, 926, 927

[56] References Cited

U.S. PATENT DOCUMENTS

| | | | |
|---|---|---|---|
| 2,174,527 | 10/1939 | Peterson | 260/78 R |
| 3,514,498 | 5/1970 | Okazaki | 260/857 PE |
| 3,522,329 | 7/1970 | Okazaki | 260/857 PE |
| 3,549,724 | 12/1970 | Okazaki | 260/857 PE |
| 3,632,666 | 1/1972 | Okazaki | 260/857 PE |
| 3,636,135 | 1/1972 | Garforth | 260/857 PE |
| 3,839,245 | 10/1974 | Schlessman | 260/857 PE |
| 3,923,925 | 12/1975 | Schneider | 260/857 PE |

FOREIGN PATENT DOCUMENTS

2273021 12/1975 France .
45-41638 12/1970 Japan .
47-08934 3/1972 Japan .

*Primary Examiner*—Paul Lieberman
*Attorney, Agent, or Firm*—Bacon & Thomas

[57] ABSTRACT

Hydrolysis-resistant copolyether-esteramides according to this invention are terminated, at one chain end, by a hydrocarbon radical and at the other chain end by a hydroxyl group. The sequential linear aliphatic copolyether-esteramides according to the invention are obtained by a polycondensation reaction of linear aliphatic dicarboxylic polyamide oligomers having a molecular weight comprised between 300 and 15,000, with $\omega\text{-}\omega'$-dihydroxyl polyoxyalkylene sequences having a molecular weight comprised between 100 and 6000 in the presence of a linear aliphatic monocarboxylic polyamide oligomer having a carboxyl group at one end of the macromolecular chain and a hydrocarbon radical at the other end thereof.

11 Claims, No Drawings

HYDROLYSIS-RESISTANT COPOLYETHER-ESTERAMIDES

This is a continuation of application Ser. No. 870,578, filed Jan. 18, 1978 now abandoned.

The present invention is related to thermoplastic sequential linear aliphatic copolyether-esteramides exhibiting a high resistance to hydrolysis.

The known copolyether-esteramides of this type have excellent mechanical properties, as far as the manufacture of moulded articles, films, sheaths or textile fibres is concerned. However, in most cases the known copolyether-esteramides exhibit a poor resistance to hydrolysis, due to the presence of free carboxyl groups at the chain ends, which groups have a catalytic effect on the hydrolysis of the ester functions contained in the macromolecule, whereby a chemical degradation of the macromolecular chain is initiated.

It is an aim of the present invention to overcome this drawback, as well as other drawbacks of the known substances of the above-defined type.

The hydrolysis-resistant copolyether-esteramides according to the invention are terminated, at one chain end, by a hydrocarbon radical and at the other chain end by a hydroxyl group. The sequential linear aliphatic copolyether-esteramides according to the invention are obtained by a polycondensation reaction of linear aliphatic dicarboxylic polyamide oligomers having a molecular weight comprised between 300 and 15,000 with $\omega$-$\omega'$ dihydroxyl polyoxyalkylene sequences having a molecular weight comprised between 100 and 6,000 in the presence of a linear aliphatic monocarboxylic polyamide oligomer having a carboxyl group at one end of the macromolecular chain and a hydrocarbon radical at the other end thereof.

This monocarboxylic polyamide having a hydrocarbon radical at one chain end is obtained by a known method comprising polymerizing or polycondensating the monomers of aliphatic polyamides of the type 6, 6-6, 6-10, 11 or 12 constituting alicyclic lactams, aminoacids, diacids and diamines in the presence of a monocarboxylic acid which, at the same time, acts as a macromolecular chain inhibitor and the amount of which, as used in the reaction, must be determined as a function of the desired molecular weight.

Organic monocarboxylic acids which may be used when preparing the monocarboxylic polyamides are saturated aliphatic acids containing 2 to 24 carbon atoms: such as acetic acid, propionic acid, butyric acid, isobutyric acid, hexanoic acid, heptanoic acid, decanoic acid, lauric acid, myristic acid, palmitic acid and stearic acid.

The proportion by weight of monocarboxylic polyamide oligomers used with respect to the copolyether-esteramide obtained is comprised between 0.2 and 15%, preferably between 0.5 and 10%.

Although the polycondensates according to the invention are sequential linear aliphatic copolyether-esteramides, it is possible to use aromatic or cyclo-aliphatic monocarboxylic acids such as benzoic acid, toluic acid or cyclohexanoic acid with a view to obtaining a hydrocarbon radical at the chain end, since the very small amount of such acids which is used and the small proportion of the rings or nuclei located only at one end of the macromolecular chain do not modify the properties of a sequential polycondensate having a linear aliphatic structure.

During the polycondensation reaction of the polyamide sequences with the polyoxyalkylenes sequences the monocarboxylic polyamide having a hydrocarbon radical at one chain end also acts as a chain inhibitor, and the amount of the polyamide introduced must be determined as a function of the desired average molecular weight of the final product.

The monocarboxylic polyamides used have a molecular weight comprised between 300 and 15,000, and preferably comprised between 800 and 5,000.

The dicarboxylic polyamides are obtained by known methods comprising polycondensating the monomers of a linear aliphatic polyamide of the type 6, 6-6, 6-10, 11 or 12 in the presence of a saturated aliphatic diacid such as succinic acid, adipic acid, suberic acid, azelaic acid, sebacic acid and dodecanedioic acid.

Since this diacid acts as a chain inhibitor in the polymerization reaction of the lactam or in the polycondensation reactions, the initially introduced amount must be determined as a function of the desired average molecular weight.

With a view to obtaining the polyamide, it is possible to start from lactams or aminoacids the hydrocarbon-containing chain of which includes 4 to 14 carbon atoms, for example caprolactam, oenantholactam, dodecalactam, undecanolactam, dodecanolactam, 11-amino-undecanoic acid or 12-aminododecanoic acid.

The polyamide may also be constituted by the product of a condensation reaction of a dicarboxylic acid with a diamine, such as nylon 6-6, 6-9, 6-10, 6-12 and 9-6, products of the condensation reaction of hexamethylene diamine with adipic acid, azelaic acid, sebacic acid, 1-12-dodecanedioic acid, and of nonamethylene diamine with adipic acid.

The polyamide sequences used have an average molecular weight comprised between 300 and 15,000, preferably comprised between 300 and 5,000.

The monomers used for obtaining the monocarboxylic polyamide and $\omega$-$\omega'$-dicarboxylic polyamide sequences are preferably of a similar nature.

Polyethers having hydroxyl groups at their chain ends are linear or branched polyoxyalkylene glycols such as polyoxyethylene glycol, polyoxypropylene glycol, polyoxytetramethylene glycol or mixtures thereof, or a copolyether derived from the above-listed compounds, the average molecular weight of such polyethers being comprised between 100 and 6,000, preferably between 400 and 3,000.

The amount by weight of polyoxyalkylene glycol with respect to the total weight of the constituents may vary from 1 to 85% and is preferably comprised between 3 and 50%.

The polycondensation reaction for preparing a polyetheresteramide is carried out in the presence of a catalyst under stirring and under a high vacuum on the order of 0.05 to 15 mm Hg at a temperature higher than the melting points of the constituents used with a view to maintaining the reaction medium in a fluid state, and the temperature being comprised between 100° and 400° C., preferably between 200° and 300° C.

The reaction time may vary from 10 minutes to 10 hours and is preferably comprised between 1 and 7 hours.

This reaction time depends on the nature of the polyoxyalkylene glycol, and it must be sufficiently long so as to allow the final viscosity to be obtained which is required for the preparation of products having satisfactory properties as far as mouldability or extrudability are concerned.

Additives such as antioxidants, photo-stabilizers, heat-stabilizers, fire-retarding agents and colouring agents must be added to the polycondensate thus obtained prior to the shaping or transforming operations, or, if possible, during the polycondensation reaction, with a view to improving the properties of the product or to modifying said properties in accordance with any particular envisaged practical practical application.

It has been found that according to a particularly advantageous embodiment of the present invention it is possible to prepare the novel copolyether-esteramides by a method comprising introducing at the start of the reaction an antioxidant constituted by 4-4'bis($\alpha$-$\alpha$'-dimethylbenzyl) diphenylamine which has a stabilizing effect against aging and furthermore causes the reactions to take place in a more regular manner without affecting the final result of said reaction.

The control and identification parameters are determined as indicated herein below:

intrinsic viscosity is determined in metracresol at 25° C. by means of a Ubelhode viscometer;

the tensile strength properties are determined in accordance with ASTM D-638 standards.

The invention will be described in a more detailed manner by means of the examples herein after, which are given by way of illustration, but not of limitation.

EXAMPLE 1

224 g 11-dicarboxylic polyamide having an average molecular weight (Mn) of 2090, previously prepared by a polycondensation reaction of 11-aminoundecanoic acid in the presence of adipic acid, and 36 g 11-monocarboxylic polyamide having an average molecular weight (Mn) of 2,000, previously prepared by a polycondensation reaction of 11-aminoundecanoic acid in the presence of stearic acid were introduced into a reactor having a capacity of one liter. 125 g polyoxytetramethylene glycol having an average molecular weight (Mn) of 1,000 and 1.5 g tetrabutyl-orthotitanate, as well as 4 g of 4-4'-bis-($\alpha$-$\alpha$'-dimethylbenzyl) diphenylamine were then added.

The reaction mixture was placed into an inert atmosphere and heated until the temperature reached 260° C., whereafter a vacuum was established in the reactor and the mixture was vigorously stirred from the moment when the constituents started to melt. The reaction was continued for 3 hours at 260° C. under a pressure of 0.1 mm Hg, the stirring speed being reduced progressively as the viscosity of the reaction medium increased.

The resulting product had an intrinsic viscosity $|\eta|$ of 1.5. Its melting point, as determined by differential thermal analysis, was 173° C.

Analysis gave the following results, as far as the chain end groups were concerned:
NH$_2$: traces
COOH: 0.01 meq/g After treatment in an oven the product was extruded at 210° C. in a BRABENDER extruder running at a speed of 80 RPM, and then injection-moulded in an ARBURG press.

Dynamometrical tests gave the following results:
Tensile strength yield threshold: 95 kg/cm$^2$
Yield threshold extension: 16%
Breaking tensile strength: 325 kg/cm$^2$
Breaking extension: 480%.

The test-pieces were immersed in permuted water at 100° C. and samples were taken at various time intervals, giving the following results:

| Dwelling time in water at 100° C. (days) | Yield threshold | | Rupture | |
|---|---|---|---|---|
| | Extension (%) | Tensile strength (kg/cm$^2$) | Extension (%) | Tensile strength (kg/cm$^2$) |
| 4 | 25 | 100 | 510 | 310 |
| 7 | 25 | 105 | 505 | 305 |
| 11 | 25 | 110 | 500 | 280 |
| 14 | 25 | 110 | 500 | 270 |
| 21 | 25 | 115 | 350 | 165 |
| 28 | 25 | | 13 | 80 |

EXAMPLE 2

For comparison purposes a standard or reference copolyetheresteramide has been prepared without using monocarboxylic polyamide.

314 g 11-dicarboxylic polyamide having an average molecular weight (Mn) of 2090 previously prepared by a polycondensation reaction of 11-aminoundecanoic acid in the presence of adipic acid, 150 g polyoxytetramethylene glycol having an average molecular weight (Mn) of 1,000, 1.5 g tetrabutylorthotitanate and 5 g 4-4'-bis-($\alpha$-$\alpha$'-dimethylbenzyl) diphenylamine were introduced into a reactor having a capacitor of 1 liter.

The reaction took place under conditions similar to those described in Example 1.

The following properties were obtained:
$|\eta| = 1.5$
NH$_2$: traces
COOH: 0.07 meq/g
melting point: 173° C.

The technological tests gave the following results:

| Dwelling time in water at 100° C. (days) | Yield threshold | | Rupture | |
|---|---|---|---|---|
| | Extension (%) | Tensile strength (kg/cm$^2$) | Extension (%) | Tensile strength (kg/cm$^2$) |
| 0 | 14 | 90 | 350 | 260 |
| 4 | 24 | 115 | 260 | 190 |
| 7 | 24 | 120 | 260 | 190 |
| 11 | 24 | 120 | 130 | 155 |
| 14 | | | 30 | 125 |

It must be noted that the polycondensate obtained under similar conditions without using monocarboxylic polyamide can be shelved safely for only 7 days instead of 14 days.

EXAMPLE 3

910 g powderous 6-dicarboxylic polyamide having an average molecular weight (Mn) of 1300, previously prepared by polymerizing $\epsilon$-caprolactam in the presence of a chain inhibitor constituted by adipic acid, 130 g powderous 6-monocarboxylic polyamide having an average molecular weight (Mn) of 1300, previously prepared by polymerization of $\epsilon$-caprolactam in the presence of a chain inhibitor constituted by oenanthic acid, 520 g polyoxytetramethylene glycol having an average molecular weight (Mn) of 650, 1.6 g tetra-isopropylorthotitanate and 14 g 4-4'bis-($\alpha$-$\alpha$'-dimethylbenzyl) diphenylamine were introduced into a 6 liter capacity reactor made of stainless steel and provided with a variable-speed agitating device.

A high vacuum (less than 0.5 Torr) was established within the reactor, the mixture was agitated at low speed, and heated. When the temperature reached 200° C., the reaction medium was entirely in the molten state, and at this time the agitating speed was increased to a sufficiently high value in order to ensure the intimate mixing of the two non-miscible polyether and polyamide phases. Heating was continued until a temperature of 260° C. was reached.

The reaction was continued for a sufficient length of time in order to produce a substance having an appropriate viscosity, this product having the following properties:

$|\eta| = 1.5$
NH$_2$: traces
COOH: 0.1 meq/g
melting point: 191° C.

Test pieces were submitted to hydrolysis tests in permuted water at 100° C.

| Dwelling time in water at 100° C. (days) | Yield Threshold | | Rupture | |
|---|---|---|---|---|
| | Extension (%) | Tensile strength (kg/cm$^2$) | Extension (%) | Tensile strength (kg/cm$^2$) |
| 0 | 14 | 100 | 390 | 360 |
| 2 | 30 | 117 | 270 | 260 |
| 5 | 30 | 117 | 265 | 266 |
| 7 | 30 | 117 | 265 | 260 |
| 14 | 28 | 119 | 180 | 210 |
| 21 | 0 | 0 | 0 | 0 |

EXAMPLE 4

A standard or reference copolyether-esteramide has been prepared by synthesis for comparison purposes, without using monocarboxylic polyamide.

350 g 6-dicarboxylic polyamide having an average molecular weight (Mn) of 1300, previously prepared by a polycondensation reaction of ε-caprolactam in the presence of adipic acid, 175 g polyoxytetramethylene glycol having an average molecular weight (Mn) of 650, 1 g tetrabutyl orthotitanate and 10.5 g 4-4'bis-(α-α'-dimethylbenzyl) diphenylamine were introduced into a 2 liter reactor.

The reaction took place under conditions similar to those described in Example 3.

The resulting product had the following properties:
$|\eta|: = 1.45$
NH$_2$: traces
COOH: 0.075 meq/g
melting point: 192° C.

Test pieces were submitted to a hydrolysis test in permuted water at 100° C.

| Dwelling time in water at 100° C. (days) | Yield Threshold | | Rupture | |
|---|---|---|---|---|
| | Extension (%) | Tensile Strength (kg/cm$^2$) | Extension (%) | Tensile Strength (kg/cm$^2$) |
| 0 | 12 | 90 | 365 | 310 |
| 2 | 24 | 100 | 170 | 200 |
| 7 | 24 | 100 | 65 | 150 |
| 10 | 0 | 0 | 0 | 0 |

When comparing these results to those in Example 3, it will be seen that the polycondensate prepared without using monocarboxylic polyamide can be shelved under satisfactory conditions for only 2 days instead of 7 days.

EXAMPLE 5

243 g 11-dicarboxylic polyamide having an average molecular weight (Mn) of 2090, previously prepared by polycondensation of 11-aminoundecanoic acid in the presence of adipic acid and 17.5 g 11-monocarboxylic polyamide having an average molecular weight (Mn) of 2000, previously prepared by polycondensation of 11-aminoundecanoic acid in the presence of stearic acid are introduced into a reactor having a capacity of 2 liters. 131 g polyoxyethylene glycol having an average molecular weight (Mn) of 1000, 1.5 g tetrabutylorthotitanate and 5 g 4-4'-(α-α'-dimethylbenzyl) diphenylamine are then added.

The reaction takes place under conditions similar to those described in Example 1.

The resulting product has the following properties:
$|\eta| = 1.5$
NH$_2$: traces
COOH: 0.01 meq/g
melting point: 173° C.

Test pieces were submitted to a hydrolysis test in permuted water at 100° C.

| Dwelling time in water at 100° C. (days) | Yield Threshold | | Rupture | |
|---|---|---|---|---|
| | Extension (%) | Tensile strength (kg/cm$^2$) | Extension (%) | Tensile strength (kg/cm$^2$) |
| 0 | 24 | 105 | 420 | 290 |
| 2 | 24 | 105 | 420 | 290 |
| 5 | 23 | 105 | 420 | 290 |
| 7 | 24 | 100 | 420 | 280 |
| 14 | 24 | 95 | 380 | 240 |
| 21 | 0 | 0 | 0 | 0 |
| 28 | | | | |

The invention is not limited to the embodiments and examples described herein above. Many variants and modifications can be envisaged by those skilled in the art, without departing from the spirit and the scope of the invention as defined in the appended claims.

What is claimed is:

1. Hydrolysis-resistant sequential moldable and extrudable linear aliphatic copolyether-esteramides, wherein one chain end is constituted by a hydrocarbon radical while the other chain end is constituted by a hydroxyl group, said copolyether-esteramides being obtained by polycondensation of linear aliphatic polyamide sequences having a molecular weight comprised between 100 and 15,000, the chain ends of which are constituted by dicarboxyl groups and of ω-ω'dihydroxyl polyoxyalkylene sequences having a molecular weight comprised between 100 and 6000, in the presence of 0.2 to 15% of a linear aliphatic monocarboxylic polyamide having a molecular weight comprised between 300 and 15,000 and the chain end of which is constituted by a hydrocarbon radical.

2. The copolyether-esteramides of claim 1, wherein said linear aliphatic polyamide sequences have a molecular weight comprised between 800 and 5000.

3. The copolyether-esteramides of claim 1, wherein said linear aliphatic monocarboxylic polyamide has a molecular weight comprised between 300 and 15,000.

4. The copolyether-esteramides of claim 1, wherein said ω-ω'-dihydroxyl polyoxyalkylene sequences have a molecular weight comprised between 400 and 3000.

5. The copolyether-esteramides of claim 1, wherein said monocarboxyl polyamide is a polyamide of the 6, 6-6, 6-10, 11 or 12 type having at one of its chain ends a COOH group and at its other chain end a hydrocarbon radical, said polyamide being obtained by reacting the related monomers in the presence of a monocarboxylic acid containing 2 to 24 carbon atoms.

6. The copolyether-esteramides of claim 1, wherein the dicarboxylic polyamide is obtained by reacting the polyamide monomers of the 6, 6-6, 6-10, 11 or 12 type in the presence of saturated linear aliphatic α-ω-diacid containing 4 to 24 carbon atoms.

7. The copolyether-esteramides of claim 1, wherein said polyalkylene glycol sequences are selected from the group comprising polyoxyethylene glycols, polyoxypropylene glycols, polyoxytetramethylene glycols, and mixtures of at least any two of these said glycols.

8. The copolyester-ester-amide of claim 1, wherein an orthotitonate catalyst is present during the polycondensation reaction.

9. The copolyester-ester-amide of claim 1 wherein the amount by weight of the polyoxyalkylene glycol with respect to the total weight of the constituents is between 1 and 85%.

10. The copolyester-ester-amide of claim 1, wherein the proportion by weight of monocarboxylic polyamide used with respect to the copolyether-ester-amide is between 0.5 and 10%.

11. The copolyether-ester-amide of claim 1, wherein 4-4' bis($\alpha,\alpha'$-dimethylbenzyl)diphenylamine is present during the polycondensation reaction.

* * * * *